Feb. 20, 1940. T. F. PEARSON 2,191,237
MACHINE FOR THE MANUFACTURE OF GLASS ARTICLES
Filed Sept. 15, 1936 3 Sheets-Sheet 3
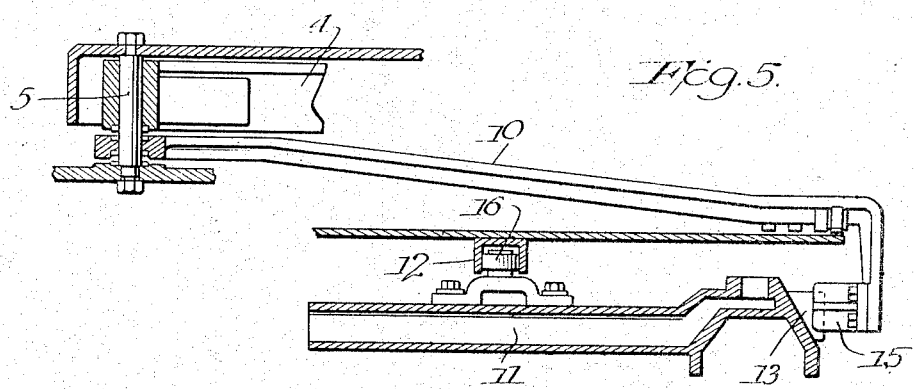
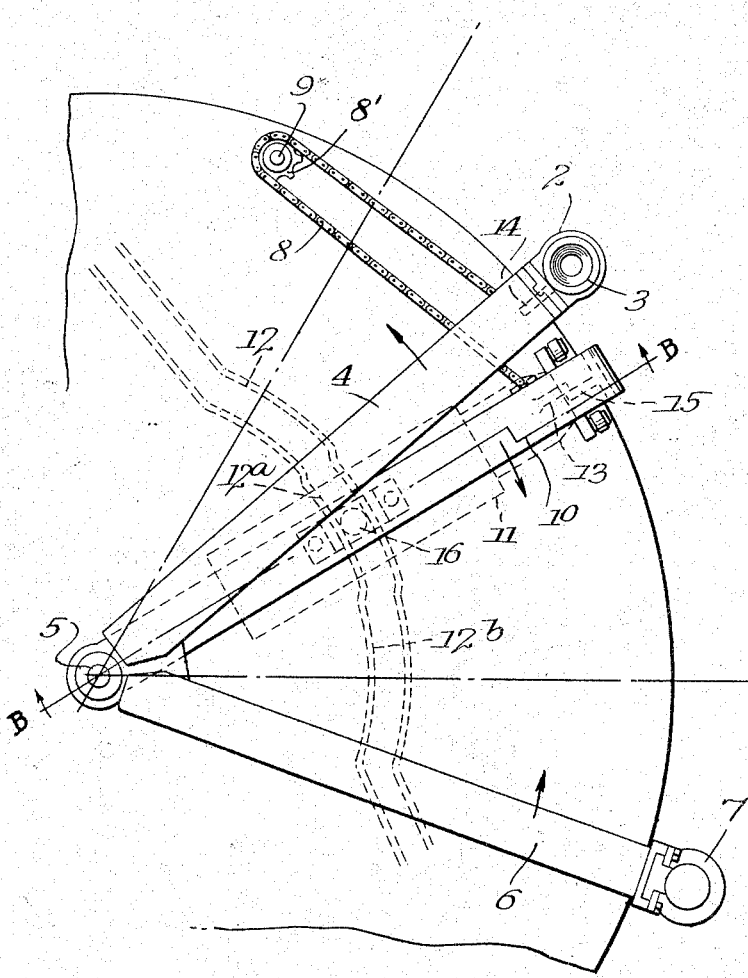
Inventor
Thomas F. Pearson Patented Feb. 20, 1940

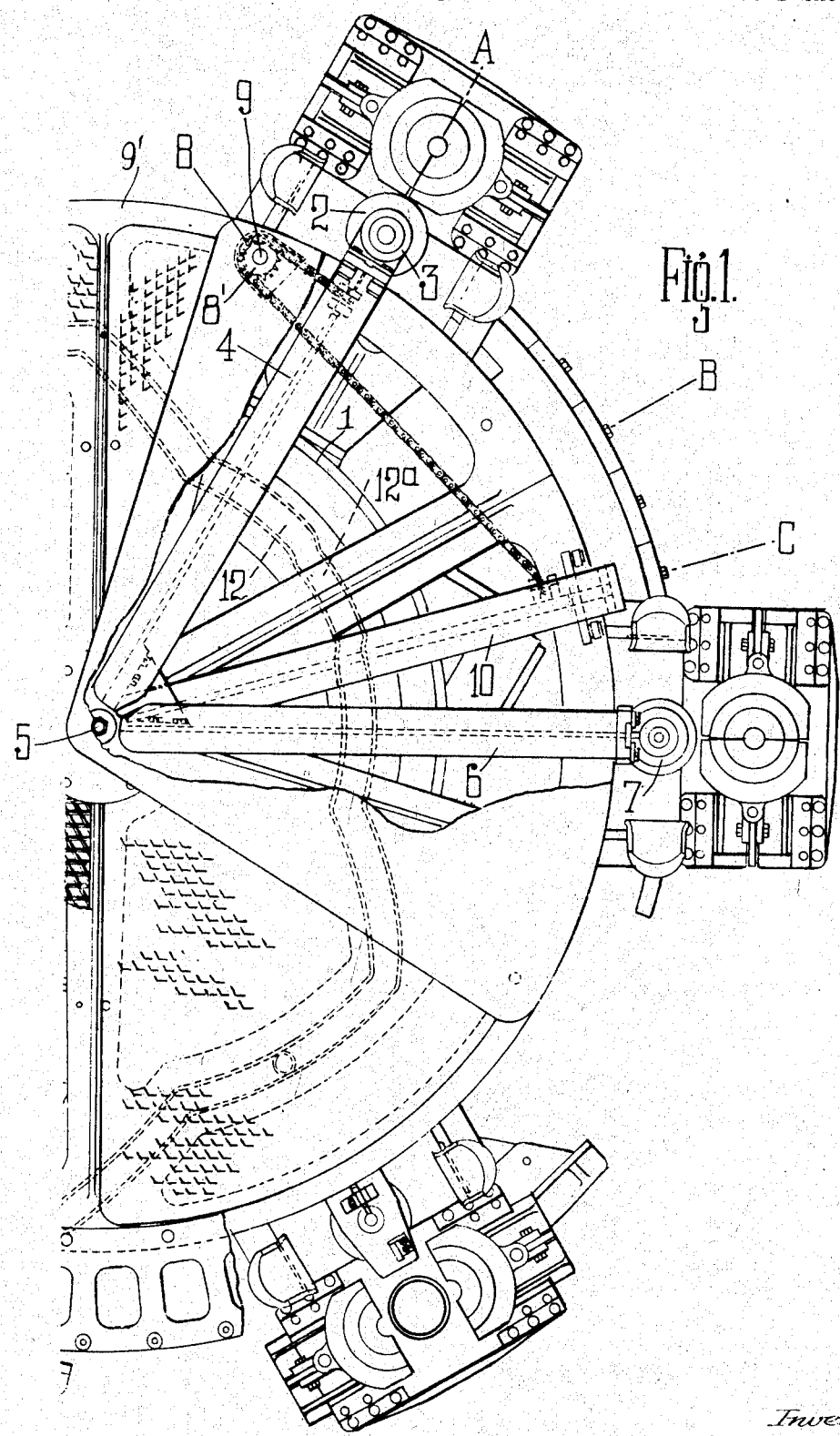

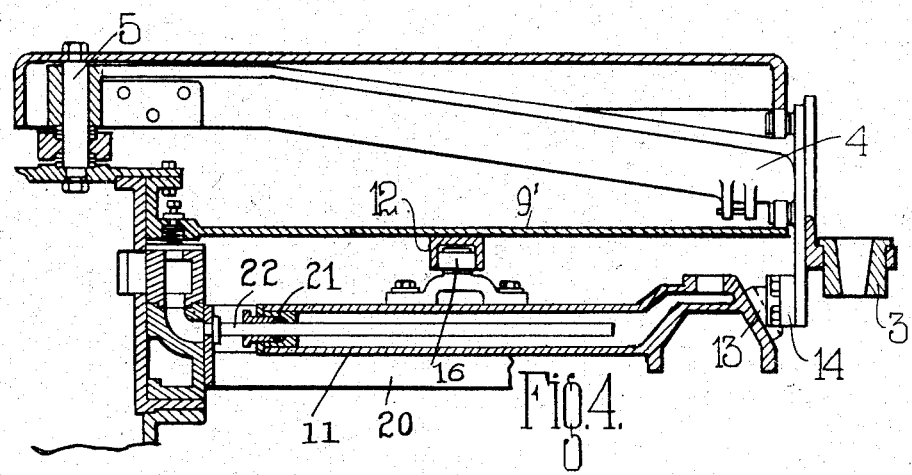
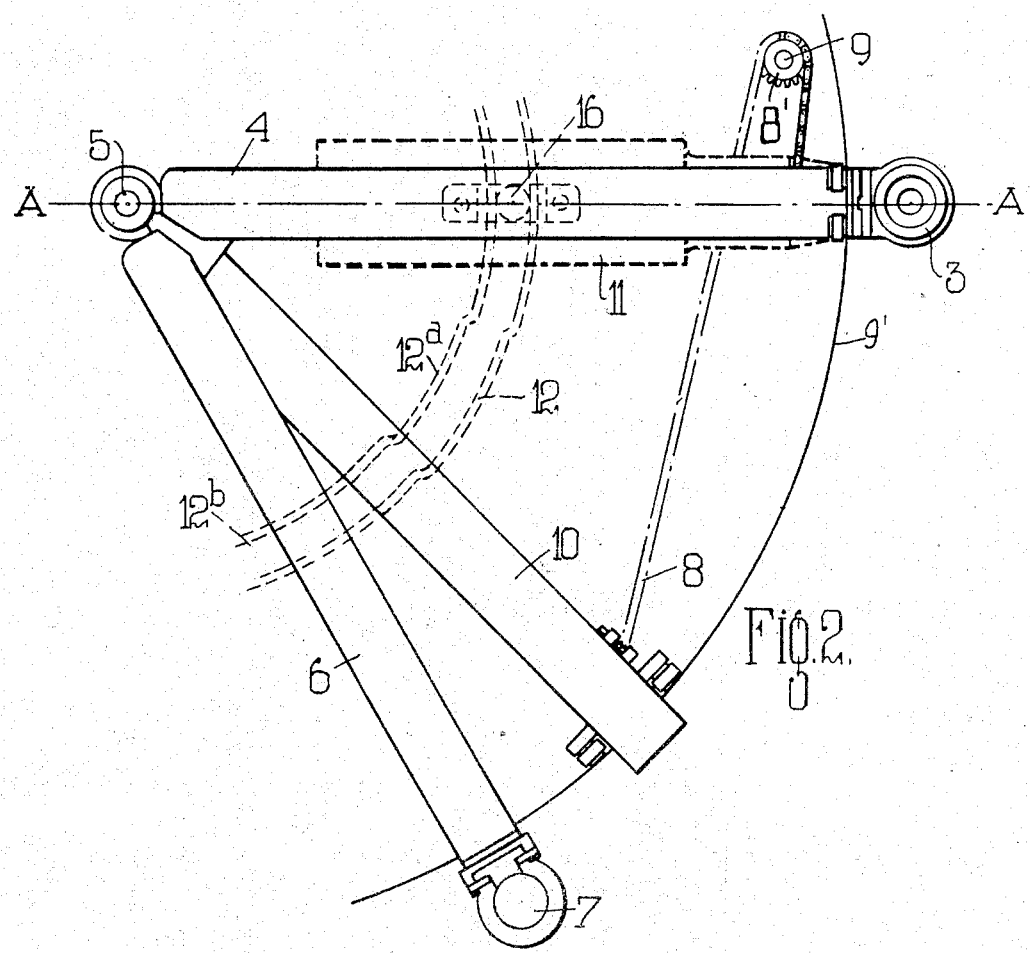

2,191,237

UNITED STATES PATENT OFFICE 2,191,237

MACHINE FOR THE MANUFACTURE OF GLASS ARTICLES

Thomas Finney Pearson, Pontefract, England, assignor to Crown Cork & Seal Company, Inc., New York, N. Y., a corporation of New York Application September 15, 1936, Serial No. 100,940
In Great Britain September 23, 1935

12 Claims. (Cl. 49—5)

The present invention relates to improvements in machines for the manufacture of glass articles of the type in which a charge of glass is dropped into a number of parison moulds in sequence and then partly blown therein.

According to this invention the funnel for guiding the charge to the parison mould and the baffle for closing the opening of the parison mould and adapted to support the base of the article to be blown therein are interconnected and oscillated in the path of the parison mould.

The invention is more particularly described with reference to the accompanying drawings, in which—

Figure 1 is a partial diagrammatic plan view of a rotary machine for the making of hollow glass articles.

Figure 2 is a diagrammatic plan view of the funnel and baffle elements on an enlarged scale, with many parts omitted for the sake of clarity.

Figure 3 is a similar view with the parts in a different position.

Figure 4 is a section on the line A—A of Figure 2 and of Figure 1.

Figure 5 is a section on the line B—B of Figure 3.

A rotary frame 1 carries parison moulds 2 which in their rotation come below a funnel 3 carried by an arm 4 rotatable about a pivot 5 concentric with the frame 1.

The arm 4 is integral with an arm 6 carrying a baffle plate 7. A chain 8 or like flexible element is connected at one end to the arm 4, and passes over a sprocket 8' rotatably mounted on a shaft 9 which is fixed to a stationary frame 9'. The opposite end of the chain 8 is connected to an arm 10 loosely pivoted about the pivot 5.

An arm 11 which may be the blow connection for the blow mould is supported above the rotary frame 1 for sliding movement on radially disposed slides or spokes 20, as shown in Figure 4. The arm is slidably connected through a packing gland 21 to a blowing air pipe 22. The arm is telescoped radially of the frame 1 by a fixed cam 12, secured to the stationary frame 9' and rotates with the frame 1. One way in which the arm 11 may be mounted in the machine is disclosed in my copending application Serial No. 111,517, filed November 18, 1936. It has a stop 13 on it which first engages a stop 14 on the end of the arm 4 and then subsequently a stop 15 on the end of the arm 10.

The operation of the device is as follows: With the parts in the position shown in Figures 1 and 2, the funnel lies over the opening in the parison mould and the arm 11 moves the funnel forward in synchronism with the parison mould 2 until the stop 13 is withdrawn from the stop 14 on the funnel by reason of the roller 16 on the arm 11 coming into the position 12ª of the cam 12. The arm 10 will, however, by reason of the chain connection 8 with the arm 4, have moved in reverse direction and will now be in a position such that the stop 13 will engage the stop 15 on this and draw the arm forward in synchronism with the frame rotation. This will cause the funnel 3 to be returned to position to be ready to lie over the next parison mould when the charge is dropped into it. The stop 13 on the arm 11 is released from the stop 15 on the arm 10 when the roller 16 on the arm 11 comes into the position 12ᵇ of the cam track.

Due to the arm 6 carrying the baffle plate 7 moving with the arm 4 it will be seen that this also will be moving back to be ready to lie over the parison mould opening and to follow around with this during the blow period which will be commensurate with the travel of the funnel 2 in synchronism with the next parison mould.

If desired, whilst the parison mould is rotating continuously, there may be a dwell in the displacement of arms 4, 6, 10, between the periods of release of the stop 14 by the stop 13 and the picking up of the stop 15. Similarly there may be a dwell between release of the stop 15 by stop 13 and picking up of the stop 14 by the next succeeding stop 13.

I declare that what I claim is:

1. A machine for manufacturing glass articles comprising a mould table rotatable about a vertical axis, a mould on said table, a funnel to guide a glass charge to said mould, a baffle plate supported in fixed relation to the funnel and movable therewith and adapted to close the mould opening during the blow period, an arm supporting said funnel, a second arm, a guide rotatable about a stationary axis, a flexible connection between said arms passing over said rotatable guide, a stop on each arm, a co-operating stop rotating in synchronism with said mould and means to engage said stop with each arm-stop in turn.

2. A machine for manufacturing glass articles comprising a support, a mould connected to said support for rotation thereabout, an arm having one end mounted for oscillation about said support and carrying at its other end a guide for glass charges, a second arm rotatable about said support in synchronism with said mould, and means for causing the second arm to engage and drive the first arm and thereby to oscillate the latter in one direction through a predetermined distance about said support, means for disengaging the second arm from the first arm after the latter has traveled said predetermined distance, and means for oscillating the first arm in the opposite direction to its original position.

3. A machine for manufacturing glass articles comprising a support, a mould rotatable about said support, an arm oscillatable about said support and carrying a guide adapted to overlie the mould at a charge receiving station and to direct charges of glass thereinto, a second arm mounted for rotation in synchronism with said mould about said support, means for causing the second arm to engage and impart movement in one direction to the first arm and thereby move the guide with the mould from the charge receiving station, means for causing the second arm to release the first arm after the guide has delivered a charge of glass to the mould, and means to return the first arm to the charge receiving station.

4. A machine for manufacturing glass articles comprising a support, a mould connected to said support for rotation thereabout, an arm having one end rotatably connected to said support and carrying at its other end a guide for glass charges, a second arm connected to said support for rotation thereabout and having a part associated therewith positioned for engagement with a member fixed with respect to the first arm, and means for radially extending the second arm to cause said part to engage the member fixed with respect to the first arm and thereby rotate it through a predetermined distance, means for radially withdrawing the second arm to disengage the part and member after the first arm has travelled a predetermined distance, and means for returning the first arm to its original position.

5. A machine for manufacturing glass articles comprising a support, a mould connected to said support for rotation thereabout, an arm having one end rotatably connected to said support and carrying at its other end a baffle plate adapted to close the mould opening during a predetermined period, a second arm connected to said support for rotation in synchronism with said mould, and means for interengaging and operatively connecting the second arm with the first arm to rotate the latter through a predetermined distance about said support, means for disengaging the second arm from the first arm after the latter has travelled said predetermined distance and means for returning the first arm to its original position.

6. A machine for manufacturing glass articles comprising a support, a mould connected to said support for rotation thereabout, an arm having one end rotatably connected to said support and carrying at its other end a baffle plate adapted to close the mould opening during a predetermined period, a second arm connected to said support for rotation in synchronism with said mould and having an abutment fixed thereon, and means for radially extending the second arm to effect an operative connection between said abutment and the first arm and thereby to rotate the latter through a predetermined distance about said support, means for radially withdrawing the second arm to disconnect the abutment from the first arm after the latter has travelled said predetermined distance and means for returning the first arm to its original position.

7. A machine for manufacturing glass articles comprising a support, a plurality of circumferentially spaced moulds connected to said support for rotation thereabout, a first arm having one end rotatably connected to said support and carrying at its other end a guide for glass charges, a second arm connected to said support for rotation thereabout and having at its end, a baffle plate adapted to close a mould opening, said arms being rigidly connected at their inner ends and the distance between their outer ends being equal to the distance between adjacent moulds, a third arm connected to said support for rotation thereabout, a connection between the third arm and the first and second arms which permits relative movement of the third arm with respect to the first and second arms only in opposite directions, a fourth arm connected to said support for rotation in synchronism with the moulds and having a part associated therewith positioned for engagement alternately with one of the first two arms and the third arm, selectively, means for causing the part associated with the fourth arm to engage the first arm and thereby rotate the latter through a predetermined distance about said support, means for disengaging said part from the first arm after the latter has travelled said predetermined distance, means for causing said part to engage the third arm after it has released the first arm, to rotate the third arm and thereby cause the first arm to rotate in the opposite direction and means for disengaging said part from the third arm after the first arm has reached its original position.

8. A machine for manufacturing glass articles including a plurality of parison moulds rotatable in unison about a vertical axis, a funnel for guiding glass charges to the moulds, a baffle plate for closing the open ends of the moulds, said funnel and baffle plate being interconnected for oscillation in unison about said axis, an operating arm oscillatable about said axis, a connection between the arm and the funnel and baffle plate serving to oscillate the former and the latter in opposite directions only, means for oscillating the funnel and baffle plate in the direction of movement of the moulds for a predetermined distance, and means operative thereafter for oscillating said arm in that direction, thereby, through said connection, to return the funnel and baffle plate to the original position.

9. A machine for manufacturing glass articles including a mould rotatable about a vertical axis, a funnel for guiding a glass charge to said mould, and means for oscillating the funnel about said vertical axis for limited movement with the mould, said means comprising an arm pivoted about said axis carrying said funnel at its outer end, a second arm pivoted about said axis, a sprocket rotatable about a fixed axis, a chain trained about said sprocket having its opposite ends operatively connected respectively to said arms, means for engaging a part fixed with respect to the first arm to move the funnel with the mould for a limited degree of movement, and means for thereafter oscillating the second arm in the same direction, thereby to return the first arm and the funnel to the original position.

10. A machine for manufacturing glass articles including a mould rotatable about a vertical axis, a baffle plate for closing the open end of the mould, and means for oscillating the baffle plate about said vertical axis for limited movement with the mould, said means comprising an arm pivoted about said axis carrying said baffle plate at its outer end, a second arm pivoted about said axis, a sprocket rotatable about a fixed axis, a chain trained about said sprocket means for operatively connecting both ends of the chain to said arms, one end to each arm, means for engaging a part fixed with respect to the first arm to move the baffle plate with the mould for a limited degree of movement, and means for thereafter oscillating the second arm in the same direction, thereby to return the first arm and the baffle plate to the original position.

11. A machine for manufacturing glass articles comprising a mould table rotatable about a vertical axis, a plurality of moulds on said table, a funnel to guide charges of glass to the moulds, a baffle plate to close the moulds during a blow period for each mould, supporting means pivoted about the axis of the table for supporting and maintaining the funnel and baffle plate in predetermined spaced relation, an arm pivoted for rotation about the same axis, a connection between said arm and said supporting means adapted to effect oscillating movements of said arm and said supporting means in opposite directions only, abutment means associated with said arm and on said supporting means, a cooperating abutment rotating with said mould table but movable with respect thereto, and means to displace said movable abutment first to engage the abutment means associated with said supporting means to move the same and the funnel and baffle plate with the table, and then to engage the abutment means associated with said arm to return the supporting means to its original position.

12. A machine for manufacturing glass articles comprising a mould table rotatable about a vertical axis, a plurality of moulds on said table, a funnel to guide charges of glass to the moulds, a baffle plate to close the moulds during a blow period for each mould, supporting means pivoted about the axis of the table for supporting and maintaining the funnel and baffle plate in predetermined spaced relation, an arm pivoted for rotation about the same axis, a fixed sprocket, a chain trained about said sprocket and having its ends connected respectively to said supporting means and to said arm to effect oscillating movements of said arm and said supporting means in opposite directions only, abutment means associated with said arm and on said supporting means, a cooperating abutment rotating with said mould table but movable with respect thereto, and means to displace said movable abutment first to engage the abutment means associated with said supporting means to move the same and the funnel and baffle plate with the table, and then to engage the abutment means associated with said arm to return the supporting means to its original position.

THOMAS FINNEY PEARSON.